United States Patent [19]

Shono

[11] Patent Number: 5,436,736
[45] Date of Patent: Jul. 25, 1995

[54] IMAGE PROCESSING APPARATUS

[75] Inventor: Seita Shono, Warabi, Japan

[73] Assignee: Canon Kabushiki Kaisha, Tokyo, Japan

[21] Appl. No.: 337,454

[22] Filed: Nov. 4, 1994

Related U.S. Application Data

[63] Continuation of Ser. No. 848,208, Mar. 10, 1992, abandoned.

[30] Foreign Application Priority Data

Mar. 15, 1991 [JP] Japan ................... 3-051281

[51] Int. Cl.⁶ .............................................. G06F 15/00
[52] U.S. Cl. ..................... 358/456; 358/455; 358/466; 358/459
[58] Field of Search ............... 358/456, 409, 466, 282, 358/75, 80, 280, 283, 284, 52, 459, 457, 443, 448, 447, 464, 437, 462, 296, 460, 455, 453

[56] References Cited

U.S. PATENT DOCUMENTS

| | | |
|---|---|---|
| 4,318,886 | 3/1982 | Kawahara et al. ............... 358/75 |
| 4,603,662 | 5/1987 | Sekizawa et al. ................ 358/75 |
| 4,734,784 | 3/1988 | Tanaka ........................ 358/283 |
| 4,876,610 | 10/1989 | Ohsawa et al. ................ 358/443 |
| 4,878,125 | 10/1989 | Katayama et al. .............. 358/443 |
| 4,958,218 | 9/1990 | Katayama et al. .............. 358/75 |
| 4,958,236 | 9/1990 | Nagashima et al. ............. 358/445 |
| 4,958,238 | 9/1990 | Katayama et al. .............. 358/456 |
| 4,975,786 | 12/1990 | Katayama et al. .............. 358/459 |
| 5,008,950 | 4/1991 | Katayama et al. .............. 382/50 |
| 5,068,746 | 11/1991 | Ohsawa et al. ................ 358/443 |
| 5,086,484 | 2/1992 | Katayama et al. .............. 382/50 |
| 5,121,447 | 6/1992 | Tanioka et al. ................ 358/466 |
| 5,128,748 | 7/1992 | Murakami et al. .............. 358/75 |
| 5,142,594 | 8/1992 | Sugishima .................... 358/437 |
| 5,153,925 | 10/1992 | Tanioka et al. ................ 358/466 |
| 5,157,741 | 10/1992 | Katayama .................... 358/459 |
| 5,162,917 | 11/1992 | Sugishima .................... 358/296 |
| 5,177,795 | 1/1993 | Tanioka et al. ................ 358/460 |
| 5,200,841 | 4/1993 | Kotaki et al. .................. 358/455 |

Primary Examiner—Paul Ip
Attorney, Agent, or Firm—Fitzpatrick, Cella, Harper & Scinto

[57] ABSTRACT

Disclosed is a binarization method for binarizing multi-level image data of an object pixel in accordance with binarized data of neighboring pixels of the object pixel which have been binarized. Multi-level image data corresponding to an object pixel are input, then a first portion of the input data is binarized in accordance with a random number, and a second portion of the data is binarized in accordance with the binarized data. The binary data of the first portion and the binary data of the second portion are output as binary data of the object pixel.

15 Claims, 9 Drawing Sheets ( MULTI-LEVEL IMAGE DATA )

| $f(i-2, j-2)$ | $f(i-2, j-1)$ | $f(i-2, j)$ | $f(i-2, j+1)$ | $f(i-2, j+2)$ |
|---|---|---|---|---|
| $f(i-1, j-2)$ | $f(i-1, j-1)$ | $f(i-1, j)$ | $f(i-1, j+1)$ | $f(i-1, j+2)$ |
| $f(i, j-2)$ | $f(i, j-1)$ | $f(i, j)$ | $f(i, j+1)$ | $f(i, j+2)$ |

200

F I G. 1A

( BINARIZED IMAGE DATA )     201

| $B(i-2, j-2)$ | $B(i-2, j-1)$ | $B(i-2, j)$ | $B(i-2, j+1)$ | $B(i-2, j+2)$ |
|---|---|---|---|---|
| $B(i-1, j-2)$ | $B(i-1, j-1)$ | $B(i-1, j)$ | $B(i-1, j+1)$ | $B(i-1, j+2)$ |
| $B(i, j-2)$ | $B(i, j-1)$ | $B(i, j)$ | | |

F I G. 1B

( WEIGHTING MASK )
$R(0.0) = R(0.1) = R(0.2) = 0$

| $R_1(-2, -2)$ | $R_1(-2, -1)$ | $R_1(-2, 0)$ | $R_1(-2, 1)$ | $R_1(-2, 2)$ |
|---|---|---|---|---|
| $R_1(-1, -2)$ | $R_1(-1, -1)$ | $R_1(-1, 0)$ | $R_1(-1, 1)$ | $R_1(-1, 2)$ |
| $R_1(0, -2)$ | $R_1(0, -1)$ | $R_1(0, 0)$ | $R_1(0, 1)$ | $R_1(0, 2)$ |

F I G. 1C

|   |   |   |   |
|---|---|---|---|
| 0 | 8 | 2 | 10 |
| 12 | 4 | 14 | 6 |
| 3 | 11 | 1 | 9 |
| 15 | 7 | 13 | 5 |

F I G. 9

IMAGE PROCESSING APPARATUS

This application is a continuation of application Ser. No. 07/848,208, filed Mar. 10, 1992, now abandoned.

BACKGROUND OF THE INVENTION

The present invention relates to an image processing apparatus for quantizing multi-level image data to binary image data.

Conventionally, an image processing method as disclosed in Japanese Patent Application Laid-Open No. 2-210959 has been proposed as a pseudo-half-tone processing method for a digital copying machine, a facsimile machine and the like. In this method, an object pixel is binarized to a black or white pixel in accordance with binary data of neighboring pixels of the object pixel which have been already binarized, and errors produced during the binarization process are added to the pixel data of other neighboring pixels which are not binarized yet.

This method has an advantage that the processing volume can be saved for an calculating operation of average density data as a threshold value for binarization, because only the binary data of the binarized neighboring pixels are required for the process. Further, as errors between input multi-level data and the average density data generated in the binarization of the input multi-level data are corrected, image data with excellent tonality can be obtained.

However, the above conventional method where the object pixel is binarized with the condition of neighboring pixels has the following drawbacks:

I. Overlaps of dots (some dots become too close to each other), etc. in highlight portions of the resulting reproduced image data deteriorate image quality;

II. When screened-dot image data are binarized, moire patterns are produced in the dot patterned area; and III. A memory for storing error data is required because errors generated in binarization are added to neighboring pixels which have not yet been binarized.

SUMMARY OF THE INVENTION

In view of the aforementioned drawbacks of the conventional method, an object of the present invention is to provide an image processing apparatus and a binarization method capable of preventing dot overlaps in highlight portions and moire patterns in dot patterned areas. The image processing apparatus provided for the above purpose, which binarizes multi-level image data of an object pixel in accordance with binary data of at least one of neighboring pixels of the object pixel which have been already binarized, comprising:

input means for inputting multi-level image data corresponding to an object pixel;

random number generating means for generating a random number;

first binarization means for binarizing a first portion of the multi-level image data input by said input means in accordance with the random number generated by said random number generating means;

modifying means for modifying second portion of the multi-level image data input by said input means in accordance with the binarized data obtained by said first binarization means;

second binarization means for binarizing said second portion modified by said modifying means in accordance with the data of the neighboring pixels of said object pixel binarized by said first binarization means; and output means for outputting the binarized data obtained by said first and second binarization means as binary data of the object pixel.

According to an aspect of the present invention, the first portion includes at least one of the lower-order bit data of said object pixel, and the second portion includes at least one of the higher-order bit data of said object pixel.

According to another aspect of the present invention, the second binarization means includes means for calculating a weighed mean value from higher bit data in the binarized data of the neighboring pixels of said object pixel, and the second binarization means binarizes said second portion in accordance with the weighed mean value.

According to further aspect of the present invention, the second binarization means includes means for diffusing errors yielded in binarization process to the neighboring pixels of said object pixel which are not binarized yet.

Another aspect of the present invention is to provide an image processing apparatus which binarizes multi-level image data of an object pixel expressed in n-bits, per pixel, comprising:

first binarization means for binarizing m (m < n) lower-order bit data of the multi-level image data of the object pixel; and second binarization means for binarizing the multi-level image data quantized by the binarization of said m lower-order bit data by said first binarization means in a manner different from that of said first binarization means.

According to one aspect of the present invention, the first binarization means comprising:

means for generating a uniform random number; and means for binarizing said m lower-order bit data in accordance with a generated random number.

According to another aspect of the present invention, the second binarization means comprising:

means for calculating a weighed mean value of surrounding pixels of said object pixel in accordance with the binarized data of neighboring pixels of the object pixel, which have been already binarized prior to binarization of said object pixel; and means for binarizing the quantized multi-level image data in accordance with said weighed mean value.

According to another aspect of the present invention, the second binarization means binarizes the quantized multi-level image data using error diffusion method.

According to another aspect of the present invention, the second binarization means binarizes the quantized multi-level image data using the dither method.

Other objects and advantages besides those discussed above shall be apparent to those skilled in the art from the description of the preferred embodiments of the invention, which follows. In that description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 1A is a diagram showing an arrangement of density data of input multi-level image data of each pixel;

FIG. 1B is a diagram showing the structure of binarized image data;

FIG. 1C is a diagram showing the structure of weighting mask;

FIG. 9 illustrates a threshold matrix for the dither method used in the fourth embodiment.

DETAILED DESCRIPTION OF THE PREFERRED EMBODIMENTS

Figure 2:
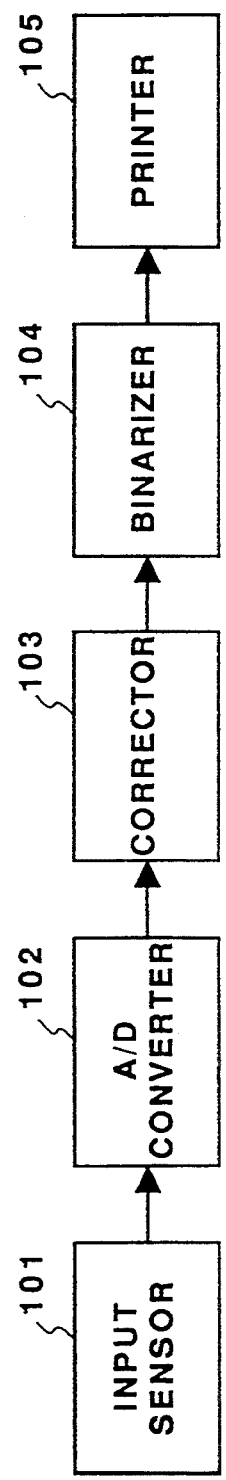
FIG. 2 is a diagram showing the structure of the first embodiment where the present invention is applied to a copying machine.

The preferred embodiments of the present invention will be described below with reference to the accompanied drawings.

[Principle]

The principle of the present image processing method will be now explained with reference to FIGS. 1A to 1C, which illustrate how input image data are binarized by this processing method.

FIG. 1A shows a disposition of pixels of the input multi-level image data; 1B, a distribution of each pixel of the binarized image data; and 1C, a disposition of masking elements for binarization.

In FIG. 1A, coordinates (i, j) mean the coordinate position of a pixel which is an object of binarization (hereinafter referred to as an object pixel), and f(i, j) denote coordinates of the multi-level image data of the object pixel of 8 bits, the value of which is within the range 0~255. Pixels above broken line 200, $f(i-2, j-2)$, $f(i-2, j-1)$ ... $f(i, j-1)$, have already been binarized. In the present method, multi-level pixels $f(i, j+1)$, $f(i, j+2)$ ... are sequentially binarized after binarization of the object pixel $f(i, j)$.

FIG. 1B illustrates an arrangement of binarized image pixels, where B(i, j) generally represent object pixel delta which has been binarized. Pixels surrounded by broken line 201 have been binarized before the binarization of the object pixel B(i, j), and are used for binarization of the object pixel f(i, j).

FIG. 1C illustrates a structure of a weighting mask employed in the present method expressed by, e.g., a 5×3 matrix where the positions of pixels are expressed in relative position manner regarding the object pixel as the origin, point i=j=0. In the present method, masking weights for pixels which are not binarized yet are expressed by $$R(0,0)=R(0, 1)=R(0, 2)=0$$

In the present image processing method, 8 bit input image data are divided into four(4) higher-order bit data and four(4) lower-order bit data, expressed by $f_H(i, j)$ and $f_L(i, j)$ respectively. The lower-order bits are binarized to 0 or 1 with a uniform random number which uniformly takes a value ranging from 0 to 15 as a threshold value. Next, the binarized lower-order bit data $B_L(i, j)$ are added to the high-order bit data $f_H(i, j)$ and thus quantized data h(i, j) are obtained. The quantized data h(i, j) is expressed as follows:

$$h(i, j) = f_H(i, j) + B_L(i, j) \qquad (1)$$

h(i, j) takes a value from 0 to 16.

Here, a weighed means value of the object pixel m(i, j) is calculated with the weighing mask R, in consideration of the contribution of the neighboring pixels of the object pixel:

$$m(i, j) = \sum_{x=-2}^{0} \sum_{y=-2}^{2} R(x, y) \cdot B(i + x, j + y) \qquad (2)$$

Error variables due to binarization $E_1(i, j-1)$ and $E_2(i-1, j)$ are assigned to be added to the quantized data h(i, j), and the added quantized data h(i, j) are binarized with the m(i, j) of equation (2) as a threshold value. Error variables $E_1(i, j)$ and $E_2(i, j)$ yielded at this binarization are calculated at the same time. B(i, j) are obtained in accordance with:

when $h(i, j)+E_1(i, j-1)+E_2(i-1, j) > m(i, j)$, $B(i, j)=1$;

and when $h(i, j)+E_1(i, j-1)+E_2(i-1, j) < m(i, j)$, $B(i, j)=0$ $E_1(i, j)$ and $E_2(i, j)$ are updated by $$E_1(i, j)=E_2(i, j)=\{h(i, j)+E_1(i, j-1)+E_2(i-1, j)-m(i, j)\}/2$$

Binarization error $E_1(i, j)$ generated at the binarization of the object pixel is added to the next pixel data (i, j+1), and $E_2(i, j)$ is added to the pixel data of the next line (i+1, j).

The above method, as for the lower-order bits can distribute the density thereof appropriately by means of quantization with a random number as a threshold, which reduces the occurrence of dot overlaps in lower density portions and moire patterns in dot patterned areas. Further, the method can preserve the density statistically since density information is converted to a quantization probability. As for the higher-order bits, it can preserve the density thereof by means of binarization based on the image information of the neighboring pixels of the object pixel and by correction of binarization errors. Thus, tonality and resolution of output images can be improved. In the present method, memory capacity can be saved since operation for correction due to binarization error is performed only for the higher-order bits.

An example of embodiments where the above principle is applied to will be described below.

First Embodiment

FIG. 2 is a block diagram showing the first embodiment where the aforementioned principle is applied to an image processing apparatus.

In FIG. 2, an input sensor 101 consists of a photoelectric transducer elements such as CCD (charge coupled device) and a driver for scanning the photoelectric transducers. The input sensor 101 reads image data and sends the input data to an A/D convertor 102 which converts the analog image data of each pixel to digital multi-level data. A corrector 103 corrects the digital data with digital operation, performing such as shading correction for correcting sensing unevenness of the CCD sensor or lighting unevenness of a lighting source. Next, the corrector 103 sends the corrected data to a binarizer 104, which binarizes the input multi-level image data with the method described with reference to FIGS. 1 and 2. A printer 105 for laser beam printing method or ink jet printing method controls dot output in accordance with the binary data from the binarizer 104 and reproduces the data on a printing sheet.

Figure 3:
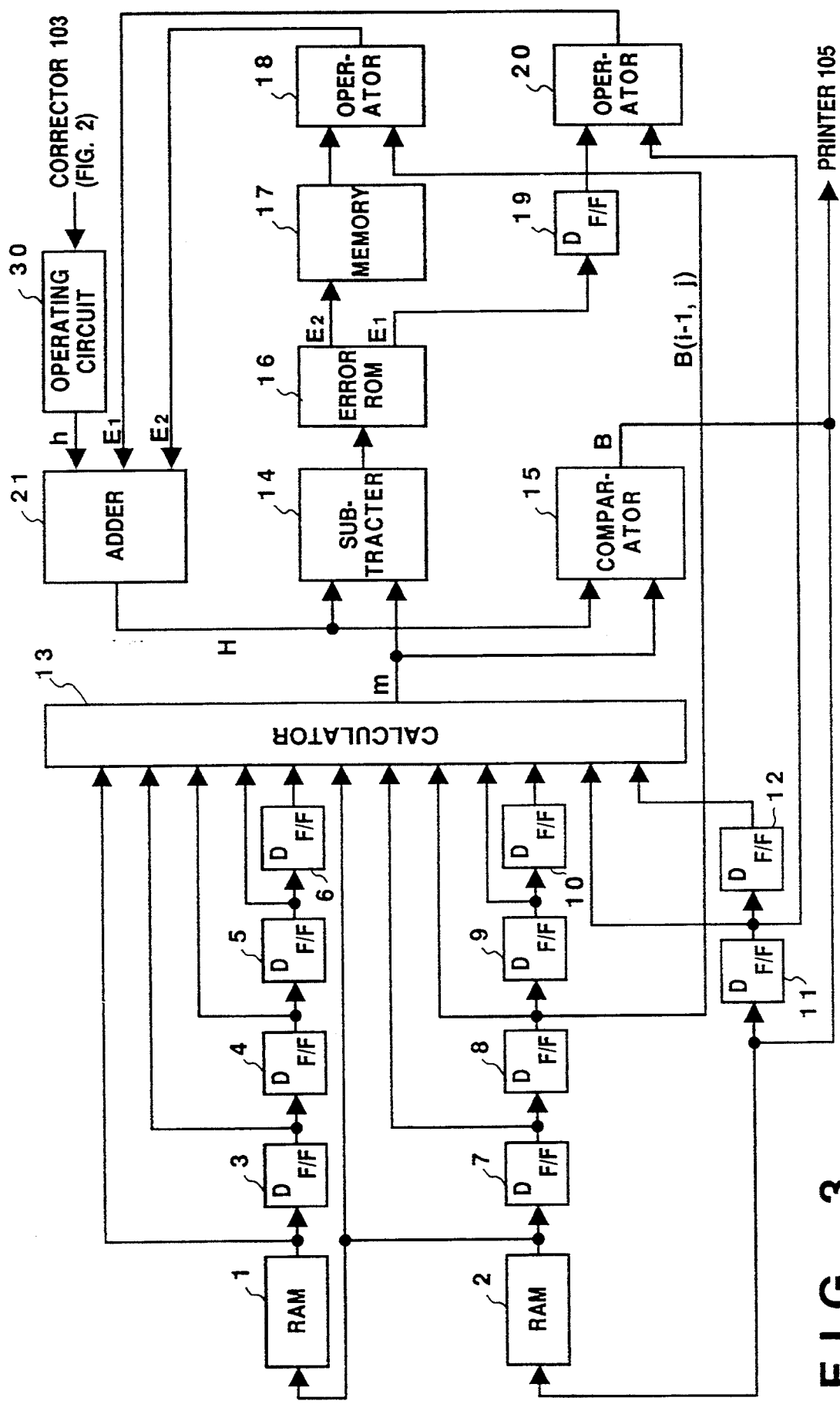
FIG. 3 is a block diagram which illustrates in detail the structure of a binarizer 104 in FIG. 2 according to the first embodiment of the present invention.
Figure 4:
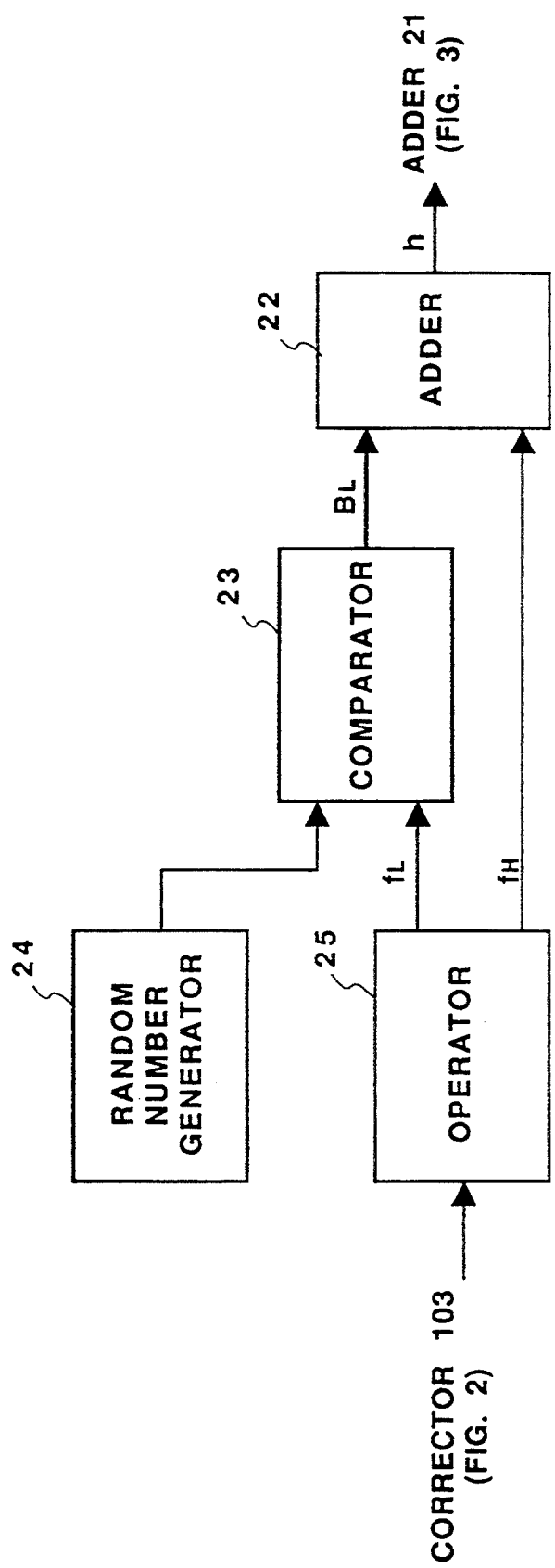
FIG. 4 is a block diagram of an operation circuit 30 in FIG. 3.

FIGS. 3 and 4 are block diagrams which illustrate in detail the structure of the binarizer 104 according to the first embodiment.

The binarizer 104 in FIG. 3 receives the multi-level image data at an operating circuit 30 (detailed structure is shown in FIG. 4), binarizes the data and outputs the binarized data from a comparator 15 to the printer 105. In FIG. 3, the numerals 1 and 2 indicate data-delaying RAM's; and 3 to 12 and 19, D-type flip-flops (hereinafter abbreviated as D-FF) for delaying binary image data by one pixel. These delaying elements extract the pixels surrounded by the broken line 201 in FIG. 1B. A calculator 13 calculates a weighted mean value m(i, j) of pixels surrounding an object pixel which are not binarized yet, specifically from the binary data of neighboring pixels of the object pixel which have been binarized. A subtracter 14 calculates errors between the weighed mean value m(i, j) as a threshold and the higher-order bit data $f_H(i, j)$ of the object pixel. A comparator 15 compares the threshold value m(i, j) output by the calculator 13 with the higher-order bit data $f_H(i, j)$, and binarizes the object pixel in accordance with the comparison result. An error ROM 16 calculates error data based on the difference sent from the subtracter 14. An error memory 17 stores the error data for one line. Operators 18 and assign ± signs to the absolute value of the error in accordance with on/off states of the dots of the adjoining pixels of the object pixel. An adder 21 adds quantized data sent from the operating circuit 30 to the error data output from the operators 18 and 20. Detailed structure of the operating circuit 30 is given in FIG. 4.

In FIG. 4, a random number generator 24 generates a random number. An operator 25 divides the input pixel data into higher-order bit data $f_H$ and lower-order bit data $f_L$, and sends the higher-order bit data $f_H$ to the adder 22, the lower-order bit data $f_L$ to a comparator 23. The comparator 23 compares a threshold value output from the random number generator 24 with the lower-order bit data $f_L$ and binarizes the lower-order bit data in accordance with the comparison result. The adder 22 adds the higher-order bit data $f_H$ to the binarized data $B_L$. The output from the adder 22 is h in the equation (1).

In FIG. 3, the delaying RAM's 1 and 2 store the binarized data. When the object pixel f(i, j) is binarized, the delaying RAM 2 outputs binary data B(i−1, j+2) which are delayed for one line and the delaying RAM 1 outputs binary data B(i−2, j+2) which are delayed for two lines. Further, the D-FF 3 outputs B(i−2, j+1); the D-FF 4, B(i−2, j); the D-FF 5, B(i−2, j−1); the D-FF 6, B(i−2, j−2); the D-FF 7, B(i−1, j+1); the D-FF 8, B(i−1, j); the F)-FF 9, B(i−1, j−1); the D-FF 10, B(i−1, j−2); the D-FF 11, B(i, j−1); and the D-FF 12, B(i, j−2) respectively.

These binary data are input into the calculator 13, which calculates a weighted mean value m(i, j) from the input data.

The operation of the operating circuit 30 in FIG. 3 will be described using FIG. 4. The object pixel data f(i, j) output from the corrector 103 are input into the operator 25. The operator 25 divides the input pixel data of 8 bits to output as four(4) higher-order bit data $f_H$ and lower-order four(4) bit data $f_L$. The random number generator 24 generates a uniform random number which takes a value ranging from 0 to 15. The comparator 23 binarizes the lower-order bit data $f_L$ and outputs the binarized data $B_L$. The adder 22 adds the higher-order bit data $f_H$ to the binarized lower-order bit data $B_L$, and outputs quantized data h(i, j) which takes a value ranging 0 to 15. The adder 21 (FIG. 3) adds the error data $E_1(i, j−1)$ and $E_2(i−1, j)$ to h(i, j).

The above-mentioned weighed mean value m(i, j) (output from the calculator 13) and the quantized pixel data H(i, j) (=h(i, j)+$E_1$(i, j−1)+$E_2$(i−1, j)) (H is an output from the adder 21) are input into the subtracter 14 and the comparator 15. The subtracter 14 calculates errors between the two input data. The comparator 15 compares the two input data and outputs binarized data B(i, j).

B(i, j) are output to the printer 105, and are also input into the delaying RAM 2 and D-FF 11 so that they may be used for the binarization of a successive object pixel which has not been binarized.

On the other hand, the difference between the quantized pixel data H output from the subtracter 14 and the threshold m are input to the error ROM 16. The error ROM 16 outputs the errors $E_1(i, j)$ and $E_2(i, j)$ in accordance with the equation (3). The error memory 17 outputs the error $E_2(i, j)$ delayed by one line. The D-FF 19 outputs the error $E_1(i, j)$ delayed by one pixel.

The operator 18 assigns a ± sign to the absolute value of the error $E_2(i, j)$ in accordance with the value of B(i−1, j) output by the D-FF 8, which saves memory capacity for information.

The input multi-level image data can be binarized by pixel by repeating the above processes.

Compared with the conventional method in which binarization is made on the basis of surrounding pixel information and binarization error correction is performed, the method according to the first embodiment which statistically quantizes only the lower-order bits (using binarization with a random number) provides the following advantages:

(1) Overlaps of dots in highlight portions can be prevented;
(2) Moire patterns appear in screened dot image can be prevented; and
(3) Memory capacity for storing correction data can be saved since the correction is required only for the binarization of the higher-order bits.

Second Embodiment

Second embodiment is to modify random numbers in accordance with the level of the higher-order bits of an object pixel.

Figure 5:
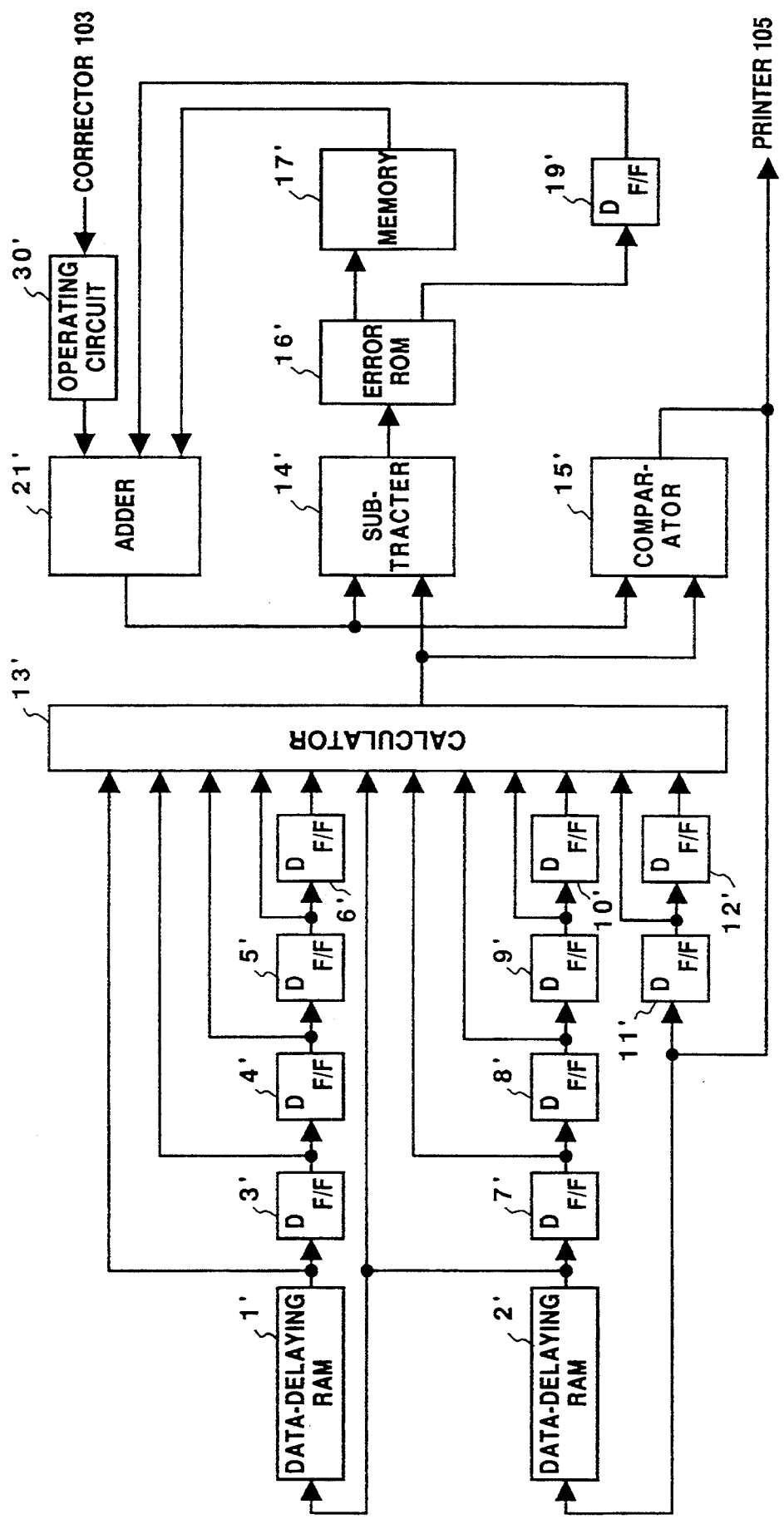
FIGS. 5 and 6 are block diagrams which illustrate in detail the structure of the binarizer 104 according to the second embodiment of the present invention.
Figure 6:
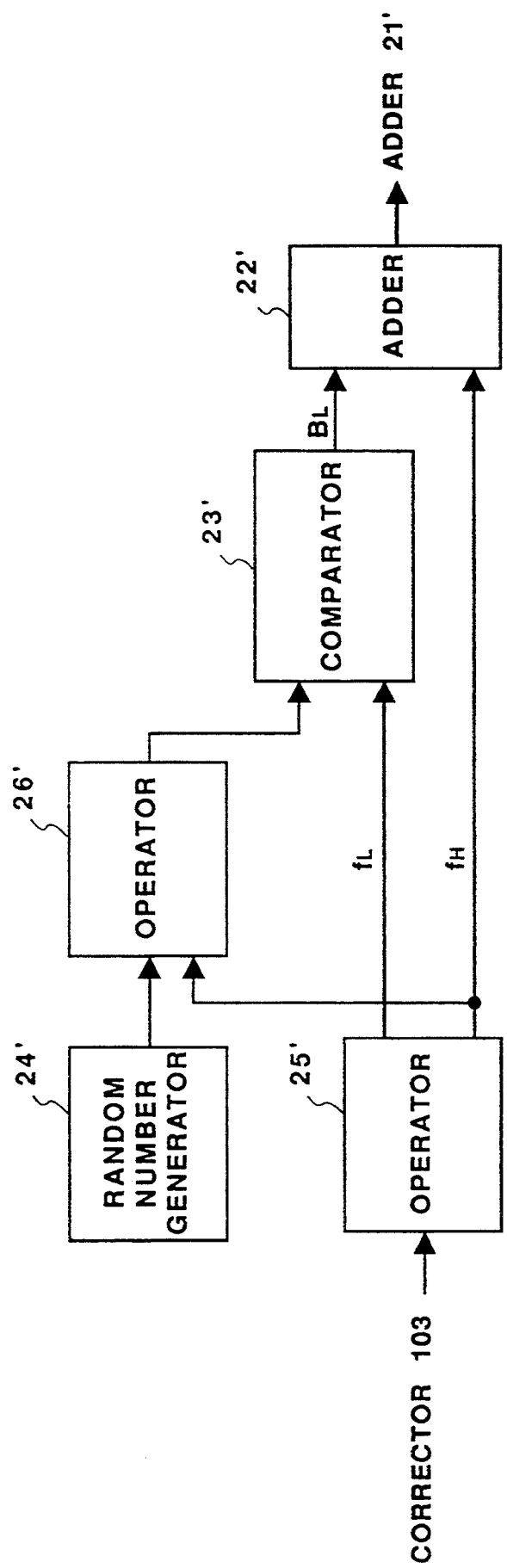

FIGS. 5 and 6 are block diagrams showing in detail the structure of the binarizer 104 according to the second embodiment.

In FIGS. 5 and 6, like elements similar to those in FIGS. 3 and 4 have the same reference numerals, with apostrophes.

In the second embodiment, the elements corresponding to the operators 18 and 20 shown in FIG. 3 are not provided. A memory 17' and a D-FF 19' output data directly to an adder 2!. An operating circuit 3040 also outputs data to the adder 21'. The operation of the adder 30' will be described with reference to FIG. 6.

As shown in FIG. 6, an operator 25' divides the input image data of an object pixel into higher-order bit data $f_H$ and lower-order bit data $f_L$. The higher-order bit data are input into an operator 26' with a random number from a random number generator 24'. The operator 26' modifies the value of the random number in accordance with the higher-order bit data $f_H$. For an example of the modification, when processing highlight portions modification of the random number so that dot probability may be lowered, which prevents dot overlaps in highlight portions and output images with high quality.

Third Embodiment

Figure 7:
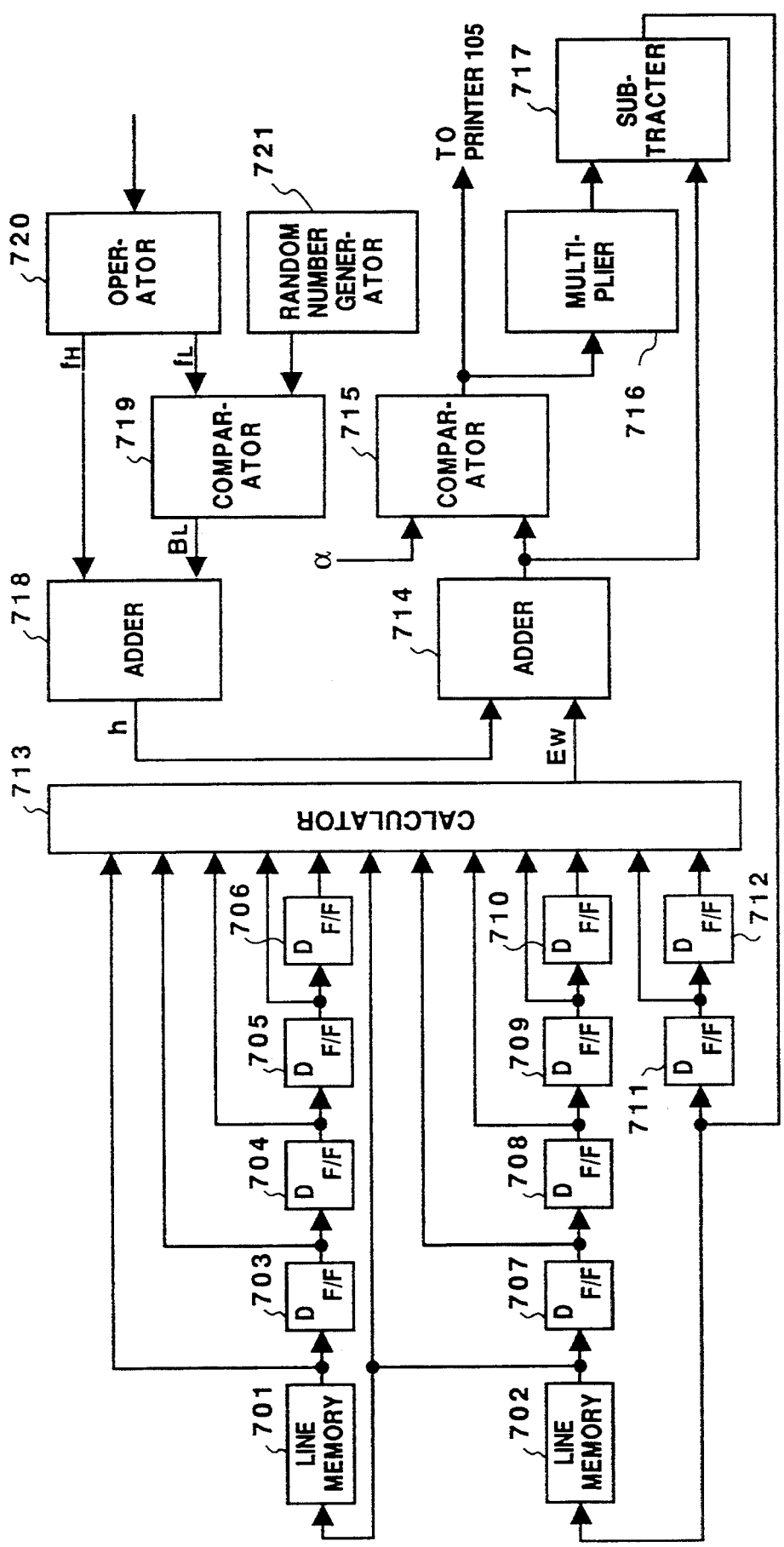
FIG. 7 is a block diagram which illustrates in detail the structure of the binarizer 104 according to the third embodiment of the present invention.

FIG. 7 is a block diagram showing the third embodiment of the present invention, where an error diffusion method is applied to the binarizer 104 in FIG. 3.

In FIG. 7, line memories 701 and 702 store binarizing error data for one line. D-FF's 703 to 712 delay the binarizing error data by one pixel time period. An operator 720 divides pixel data into higher-order bit data and lower-order bit data. A random number generator 721 generates one uniform random number per pixel. A calculator 713 calculates cumulative errors at binarization, and an adder 714 adds the cumulative errors to quantized data. A comparator 715 binarizes the corrected quantized data with a predetermined threshold value $\alpha$. A multiplier 716 multiplies the binarized data with a predetermined value and a subtracter 717 calculates errors between the corrected quantized data and the binarized quantized data. An adder 718 adds the higher-order bit data to the binarized lower-order bit data. A comparator 719 compares the lower-order bit data with the random number, and binarizes the lower-order bit data in accordance with the comparison result.

Similarly to the first embodiment, the operator 720 divides the input object pixel data f(i, j) into higher-order bit data and lower-order bit data. The lower-order bit data are input into the comparator 719 together with a random number generated by the random number generator 721. The comparator 719 binarizes the input lower-order bit data into 1 or 0 with the random number as a threshold. The adder 718 adds the binarized lower-order bit data to the higher-order bit data to obtain quantized data h(i, j).

The calculator 713 outputs the cumulative errors Err(i, j) of pixel data which have been already binarized. The adder 714 adds the quantized data h(i, j) to the cumulative errors Err(i, j). The comparator 715 binarizes h(i, j)+Err(i, j) with the predetermined threshold value $\alpha$, then outputs the binarized data to the printer 105 and the multiplier 716. The multiplier 716 multiplies the binary data from the comparator 715 with the largest value of the higher-order bit data. The subtracter 717 calculates binarization errors between the data before the binarization and the data after the binarization. The binarization errors are delayed by the line memories 701, 702 and the D-FF's 703 to 712, and are input into the calculator 713, which calculates the cumulative errors in a predetermined area.

Binarization for each pixel is carried out by repeating the above processes.

Fourth Embodiment

Figure 8:
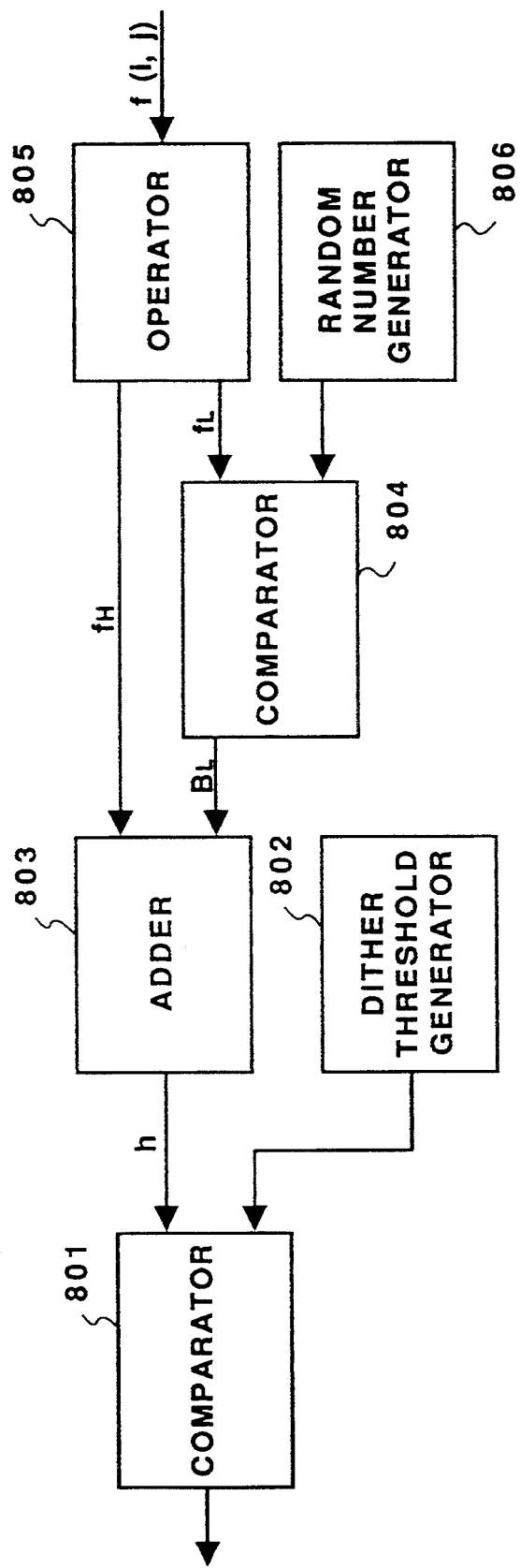
FIG. 8 is a block diagram which illustrates in detail the structure of the binarizer 104 according to the fourth embodiment of the present invention.

FIG. 8 is a block diagram of the fourth embodiment of the present invention, where the dither method is applied to the binarizer 104 in FIG. 2.

Figure 9:
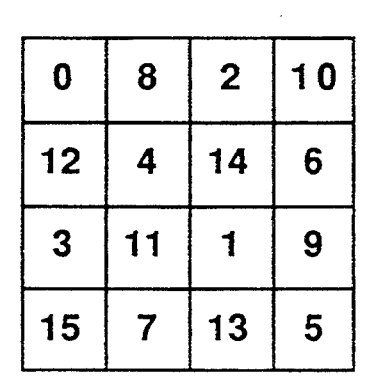

An operator 805 divides the input object pixel data f(i, j) into higher-order bit data and lower-order bit data. The lower-order bit data are input into a comparator 804 together with a random number output from a random number generator 806. The comparator 804 binarizes the lower-order bit data into 1 or 0 with the random number as a threshold. An adder 803 adds the binarized lower-order bit data to the higher-order bit data to obtain quantized data h(i, j). A dither threshold generator 802 outputs a dither threshold based corresponding to pixel position on a dither matrix as shown in FIG. 9. A comparator 801 compares the dither threshold and the quantized data and binarizes the quantized data in accordance with the comparison result.

The fourth embodiment, where a regular binarization such as dither method is combined with a random binarization, can prevent the deterioration of image quality caused by texture which is characteristic of dither method.

Advantages obtained in the fourth embodiment are as follows;

(1) Dot overlaps in highlight portions can be prevented;

(2) Moire patterns yielded in screened dot image can be prevented; and (3) Memory can be saved since binarization correction values are stored only for the higher-order bits.

The present invention is not limited to the above embodiments and various changes and modifications can be made within the spirit and scope of the present invention. Therefore, to apprise the public of the scope of the present invention, the following claims are made.

What is claimed is:

1. An image processing apparatus for binarizing multi-level image data of an object pixel in accordance with at least one of plural neighboring pixels of the object pixel which have been already binarized, comprising:

input means for inputting multi-level image data corresponding to an object pixel;

random number generating means for generating a random number;

first binarization means for binarizing a first portion of the multi-level image data input by said input means in accordance with the random number generated by said random number generating means;

modifying means for modifying a second portion of the multi-level image data input by said input means in accordance with the binarized data obtained by said first binarization means;

second binarization means for binarizing said second portion modified by said modifying means in accordance with the data of the neighboring pixels of said object pixel which have already been binarized; and output means for outputting the binarized data obtained by said second binarization means as binary data of the object pixel.

2. The image processing apparatus according to claim 1, wherein said first portion includes at least one of plural lower-order bit data of said object pixel, and said second portion includes at least one of plural higher-order bit data of said object pixel.

3. The image processing apparatus according or claim 2, wherein said second binarization means includes means for calculating a weighted mean value from the binarized data of the neighboring pixels of said object pixel, and said second binarization means binarizes said second portion in accordance with the weighted mean value.

4. The image processing apparatus according to claim 1, wherein said second binarization means includes means for diffusing errors yielded in binarization processing to the neighboring pixels of said object pixel which are not binarized yet.

5. An image processing apparatus for binarizing multi-level image data of an object pixel expressed in n bits per pixel, comprising:

first binarization means for binarizing m (m<n) lower-bit data of the multi-level image data of the object pixel; and second binarization means for binarizing the multi-level image data quantized by the binarization of said m lower-order bit data by said first binarization means using a binarization method different from that used by said first binarization means, wherein said first binarization means further comprises:

means for generating a uniform random number; and means for binarizing said m lower-order bit data in accordance with a generated random number.

6. The image processing apparatus according to claim 5, wherein said second binarization means comprises:

means for calculating a weighted mean value of surrounding pixels of said object pixel in accordance with the binarized data of neighboring pixels of said object pixel, which have been binarized prior to binarization of said object pixel; and means for binarizing the quantized multi-level image data in accordance with said weighted mean value.

7. The image processing apparatus according to claim 5, wherein said second binarization means binarizes the quantized multi-level image data with an error diffusion method.

8. The image processing apparatus according to claim 5, wherein said second binarization means binarizes the quantized multi-level image data with the dither method.

9. A binarization method for binarizing multi-level image data of an object pixel expressed in n bits per pixel, comprising the steps of:

a: binarizing m (m<n) lower-order bits of the multi-level image data of the object pixel; and b. binarizing the multi-level image data quantized by the binarization of said m lower-order bits in step a using a binarization method different from that made in step wherein said step a further comprises:

a-1: generating a uniform random number; and a-2: binarizing said m lower-order bits in accordance with the generated random number.

10. The binarization method according to claim 9, wherein step b further comprises:

b-1: calculating a weighted mean value of surrounding pixels of said object pixel in accordance with binarized data of neighboring pixels which have been already binarized prior to binarization of said object pixel; and b-2: binarizing the quantized multi-level image data in accordance with said weighted mean value.

11. The binarization method according to claim 9, wherein in step b, error diffusion method is employed for the binarization.

12. The binarization method according to claim 9, wherein in step b, dither method is employed for the binarization.

13. An image processing apparatus for binarizing multi-level image data of an object pixel expressed in n bits per pixel, comprising:

first binarization means for binarizing m (m<n) lower-order bit data of the multi-level image data of the object pixel; and second binarization means for binarizing the multi-level image data quantized by the binarization of said m lower-order bit data by said first binarization means, the binarization method of said second binarization means being different from that used by said first binarization means, wherein said first binarization means further comprises:

means for generating a random number, and means for binarization said m lower-order bit data in accordance with a generated random number, and wherein said second binarization means binarizes sum data which is obtained by adding the (n−m) higher order bit data of the multi-level image data to the binarized data by said first binarization means.

14. The apparatus according to claim 13, further comprising means for modifying a random number generated by the generating means in accordance with a value of the (n−m) higher order bit data.

15. A binarization method for binarizing multi-level image data of an object pixel expressed in n bits per pixel, comprising the steps of:

a. binarization m (m<n) lower-order bits of the multi-level image data of the object pixel; and b. binarizing the multi-level image data quantized by the binarization of said m lower-order bits in step a, the binarization method used in said step b being different from that used in step a, wherein said step a further comprises:

a-1: generating a random number, and a-2: binarizing said m lower-order bits in accordance with the generated random number, and wherein said step b further comprises:

binarizing sum data which is obtained by adding the (n-m) higher order bit data of the multi-level image data to the binarized data in said step a.

* * * * *

UNITED STATES PATENT AND TRADEMARK OFFICE
CERTIFICATE OF CORRECTION

PATENT NO. : 5,436,736
DATED : July 25, 1995
INVENTOR(S) : SEITA SHONO

It is certified that error appears in the above-indentified patent and that said Letters Patent is hereby corrected as shown below:

On the title page, item [54], and column 1, title should read--

"IMAGE PROCESSING APPARATUS" should read --IMAGE DATA BINARIZATION WITH SUPPRESSION OF MOIRE AND OF OVERLAPS IN HIGHLIGHT AREAS--.

item:[56] REFERENCES CITED

"4,603,662 5/1987 Sekizawa et al." should read
--4,663,662 5/1987 Sekizawa et al.--.

COLUMN 1

Line 23, "an calculating" should read --a calculating--.

COLUMN 2

Line 18, "weighed" should read --weighted--.
Line 21, "weighed" should read --weighted--.
Line 41, "comprising:" should read --comprises:--.
Line 46, "comprising:" should read --comprises:--.
Line 47, "weighed" should read --weighted--.
Line 53, "weighed" should read --weighted--.
Line 56, "using" should read --using the--.

UNITED STATES PATENT AND TRADEMARK OFFICE
CERTIFICATE OF CORRECTION

PATENT NO. : 5,436,736
DATED : July 25, 1995
INVENTOR(S) : SEITA SHONO

It is certified that error appears in the above-indentified patent and that said Letters Patent is hereby corrected as shown below:

COLUMN 3

Line 58, "delta" should read --data--.

COLUMN 4

Line 18, "weighed" should read --weighted--.
Line 19, "weighing" should read --weighting--; and
Line 39, "<" should read --$\leq$--.

COLUMN 5

Line 48, "18 and" should read --18 and 20--.

COLUMN 6

Line 27, "weighed" should read --weighted--.

COLUMN 7

Line 15, "adder 2!." should read --adder 21'.-- and "circuit 3040" should read --circuit 30'--.

UNITED STATES PATENT AND TRADEMARK OFFICE
CERTIFICATE OF CORRECTION

PATENT NO. : 5,436,736

DATED : July 25, 1995

INVENTOR(S) : SEITA SHONO

It is certified that error appears in the above-indentified patent and that said Letters Patent is hereby corrected as shown below:

<u>COLUMN 9</u>

Line 12, "according or" should read --according to--.

<u>COLUMN 10</u>

Line 2, "step" should read --step a,--.
    Line 37, "binarization" should read --binarizing--.

Signed and Sealed this

Twenty-third Day of January, 1996

*Attest:*

BRUCE LEHMAN

*Attesting Officer*      *Commissioner of Patents and Trademarks*